United States Patent [19]

Akashi

[11] Patent Number: 4,967,225
[45] Date of Patent: Oct. 30, 1990

[54] CAMERA INCORPORATING AUTOMATIC FOCUSING APPARATUS

[75] Inventor: Akira Akashi, Yokohama, Japan

[73] Assignee: Canon Kabushiki Kaisha, Tokyo, Japan

[21] Appl. No.: 368,937

[22] Filed: Jun. 19, 1989

Related U.S. Application Data

[63] Continuation of Ser. No. 138,155, Dec. 28, 1987, abandoned.

[30] Foreign Application Priority Data

Jan. 12, 1987 [JP] Japan .................................. 62-4577
Jan. 12, 1987 [JP] Japan .................................. 62-4581
Jan. 12, 1987 [JP] Japan .................................. 62-4582

[51] Int. Cl.$^5$ ............................................. G03B 13/36
[52] U.S. Cl. ................................................ 354/402
[58] Field of Search ................. 354/400, 402, 404, 405

[56] References Cited

U.S. PATENT DOCUMENTS

| | | | |
|---|---|---|---|
| 4,416,523 | 11/1983 | Kawabata | 354/402 |
| 4,459,006 | 7/1984 | Sakai et al. | 354/406 |
| 4,472,040 | 9/1984 | Kawabata | 354/406 |
| 4,500,188 | 2/1985 | Kitagishi et al. | 354/406 |
| 4,617,459 | 10/1986 | Akashi et al. | 250/201 |

Primary Examiner—W. B. Perkey
Attorney, Agent, or Firm—Fitzpatrick, Cella, Harper & Scinto

[57] ABSTRACT

A camera incorporating an automatic focusing apparatus capable of performing a so-called searching operation in which, when focus detecting becomes impossible, a lens is moved from a nearest end to an infinite end to detect a position of an object to be photographed and, more particularly, to improve operability of a camera having a searching operation function by preventing the searching operation after an in-focus state is obtained.

11 Claims, 10 Drawing Sheets

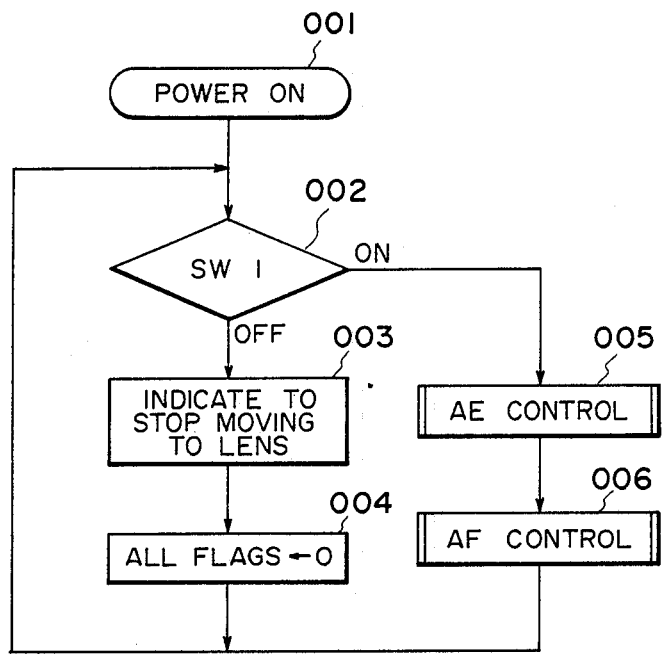
F I G. 4a

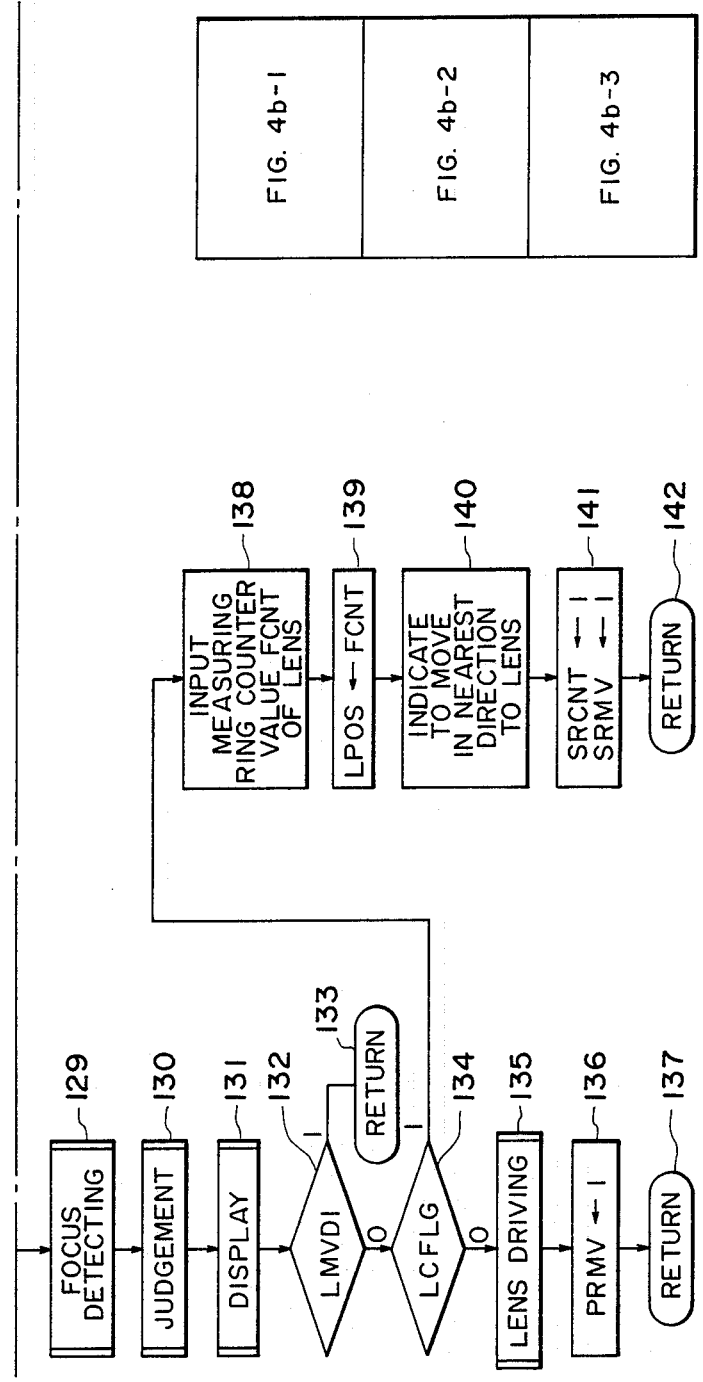

CAMERA INCORPORATING AUTOMATIC FOCUSING APPARATUS

This application is a continuation of application Ser. No. 138,155, filed Dec. 28, 1987, now abandoned.

BACKGROUND OF THE INVENTION

1. Field of the Invention

The present invention relates to a focus detecting apparatus for, e.g., a camera.

2. Description of the Prior Art

In one of conventional focus adjusting apparatuses for a camera, an exit pupil of a photographing lens is divided into two areas by a focus detecting optical system, and two images of an object to be photographed formed by light beams transmitted through the respective pupil areas are received by photoelectric conversion element arrays (e.g., CCD sensor arrays), respectively. Then, a focusing state of the photographing lens is detected in accordance with outputs from the respective sensor arrays, thereby driving the photographing lens on the basis of a detection result.

In the above focus detecting operation, if contrast of the object to be photographed is sufficient, focus detecting can be performed with high accuracy. However, if the contrast is low, focus detecting is impossible. Therefore, as a countermeasure against this problem, a so-called "searching operation" in which the photographing lens is driven independently of a detection result to increase the contrast of the object to be photographed is often performed.

The reason for this is as follows. That is, although the contrast may be low because the contrast of the object to be photographed is originally low, it may be reduced since a defocus amount of the photographing lens is large.

However, in the above searching operation, the photographing lens is normally reciprocated by turning its measuring ring between a nearest end and an infinite end. Therefore, when a telephoto lens is attached to the camera and the object to be photographed is dislocated from a so-called distance measuring frame in a viewfinder by, e.g., hand vibrations, the contrast is reduced, and the searching operation is immediately performed. As a result, it takes a long period of time to focus the object to be photographed after reciprocation.

In addition, in the above searching operation, the lens is driven after it is reciprocated once, resulting in a time-consuming operation. Therefore, if the searching operation is performed during so-called continuous photographing, a shutter chance may be missed.

Moreover, in the conventional searching operation, the lens is moved to a nearest or infinite position after it is reciprocated once, thereby stopping the searching operation. However, in many cases, an object to be photographed is located at a position immediately before the searching operation is started. Therefore, when the lens is stopped at the nearest or infinite position after the searching operation, the lens may be located at a position away from a position of the object to be photographed.

SUMMARY OF THE INVENTION

One aspect of the invention is to provide a camera incorporating an automatic focusing apparatus, in which transition to a searching operation is inhibited when, e.g., contrast is reduced after an in-focus state is obtained and hence focus detecting becomes impossible, and in which execution of the searching operation is prevented when, e.g., an object to be photographed is dislocated from a distance measuring frame after the in-focus state is obtained.

Another aspect of the invention is to provide a camera incorporating an automatic focusing apparatus, in which execution of the searching operation is prevented during so-called continuous photographing so that the focus of an object of continuous photographing is not interfered with by the searching operation.

Still another aspect of the invention is to provide a camera incorporating an automatic focusing apparatus, in which a lens is driven between nearest and infinite positions by the searching operation and then is moved to a position at which the searching operation is started to finish the searching operation, thereby easily performing a focusing operation with respect to an object to be photographed.

Other aspects of the present invention will become more apparent from an embodiment to be described below with reference to the accompanying drawings.

BRIEF DESCRIPTION OF THE DRAWINGS

FIGS. 4a, 4b, 4b-1, 4b-2, 4b-3, and 4c to 4f are flow charts of programs for explaining operations of the camera according to the present invention.

DESCRIPTION OF THE EMBODIMENT OF THE INVENTION

Figure 1:
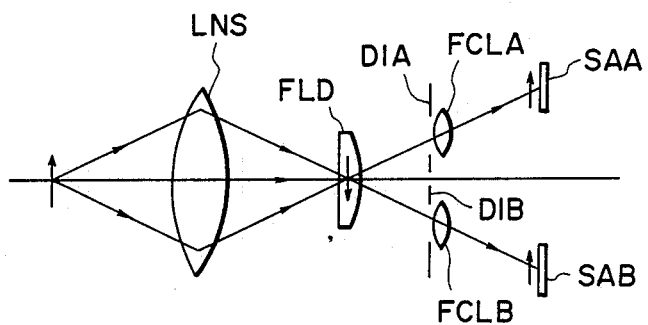
FIG. 1 is a schematic view for explaining an optical principle of a focus adjusting apparatus of the present invention.

First, a focus detecting principle of the present invention will be described below with reference to FIG. 1. A field lens FLD is arranged on the same optical axis as that of a photographing lens to be focused. Two secondary focusing lenses FCLA and FCLB are arranged at symmetrical positions behind the field lens FLD and with respect to the optical axis, and sensor arrays SAA and SAB are arranged therebehind, respectively. Diaphragms DIA and DIB are provided near the secondary focusing lenses FCLA and FCLB. The field lens FLD substantially focuses an exit pupil of the photographing lens LNS on pupil surfaces of the secondary focusing lenses FCLA and FCLB. As a result, light beams respectively incident on the secondary focusing lenses FCLA and FCLB are emitted from equal areas of the exit pupil surface of the photographing lens LNS respectively corresponding to the secondary focusing lenses FCLA and FCLB. These equal areas do not overlap each other. When an image formed near the field lens FLD is focused on the sensor arrays SAA and SAB by the secondary focusing lenses FCLA and FCLB, respectively, two images on the sensor arrays SAA and SAB change their positions on the basis of an axial change in position of the image formed near the field lens FLD. Therefore, by detecting a displacement (deviation) between relative positions of the two images on the respective sensor arrays, a focusing state of the photographing lens can be detected.

Figure 2:
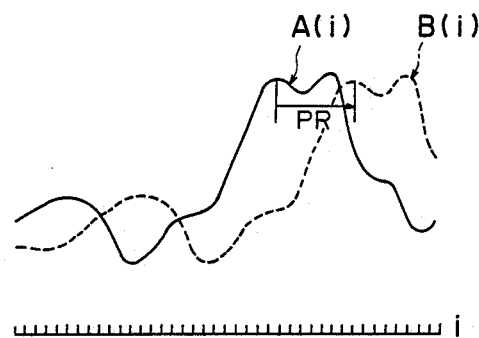
FIG. 2 is a schematic view of waveforms showing outputs from sensors SAA and SAB of FIG. 1.

FIG. 2 shows photoelectric conversion outputs of the two images formed on the sensor arrays SAA and SAB. In FIG. 2, an output from the sensor array SAA is A(i)

($i=0, \ldots, 39$), and an output from the sensor array SAB is B(i). Note that the number of pixels of a sensor is 40.

Signal processing methods of detecting image deviation PR in accordance with image signals A(i) and B(i) are disclosed in Japanese Laid-Open Patent Application Nos. 142306/1983, 107313/1984, and 101513/1985 or in Japanese Patent Application No. 160824/1986 by the present inventor.

By adjusting a focusing state of the photographing lens on the basis of image deviation obtained by the above disclosed methods, the photographing lens can be set in an in-focus state.

Figure 3:
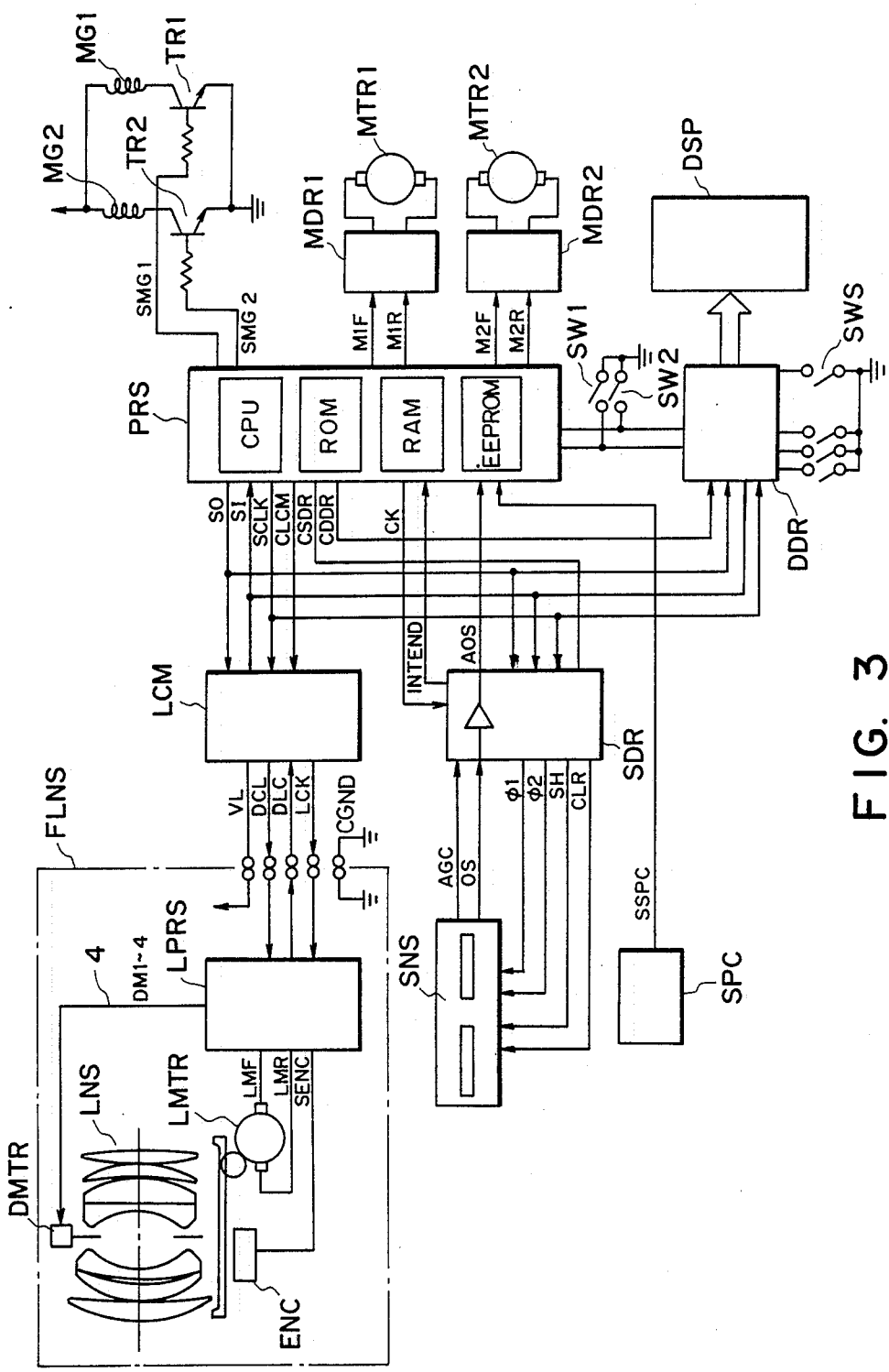
FIG. 3 is a circuit diagram showing an embodiment of a camera according to the present invention.

FIG. 3 is a circuit diagram showing an embodiment of a camera incorporating an automatic focusing apparatus according to the present invention.

In FIG. 3, a camera control unit is a one-chip microcomputer PRS having therein a CPU (Central Processing Unit), a ROM, a RAM, an EEPROM (Electrically Erasable Programmable ROM), and an A/D-converting function. In accordance with a camera sequence program stored in the ROM, the microcomputer PRS performs camera operations such as automatic exposure control, automatic focus detecting, film winding/rewinding, and the like. The EEPROM is a nonvolatile memory, and a variety of adjusting data are written therein during processing.

The microcomputer PRS communicates with a peripheral circuit and a lens using communication signals SO, SI, and SDLK and controls operations thereof.

The signal SO is a data signal output from the microcomputer PRS, the signal SI is a data signal input thereto, and the signal SCLK is a sync signal of the signals SO and SI.

A lens communication buffer circuit LCM supplies a lens power source voltage VL to the lens when the camera is operated, and when a signal CLCM from the microcomputer PRS is at a high potential level (to be referred to as "H" hereinafter, and a low potential level is to be referred to as "L" hereinafter), serves as a buffer for communication between the camera and the lens.

When the microcomputer PRS sets the signal CLCM at "H" and sends predetermined data as the signal SO in synchronism with the signal SCLK, the buffer circuit LCM outputs buffer signals LCK and DCL respectively of the signals SCLK and SO to the lens through contacts between the camera and the lens. At the same time, the buffer circuit LCM outputs a buffer signal of the signal DLC from the lens as the signal SI, and the microcomputer PRS inputs data of the lens from the signal SI in synchronism with the signal SCLK.

A driving circuit SDR drives a focus detecting line sensor unit SNS. The driving circuit SDR is selected when the signal CSDR is at "H" and is controlled by the microcomputer PRS through the signals SO, SI, and SCLK.

A signal CK is a clock for generating CCD driving clocks ø1 and ø2. A signal INTEND informs the microcomputer PRS of an end of charge.

An output signal OS from the sensor unit SNS is a time-serial image signal (charge image signal of each pixel of image light received by each pixel of the sensor arrays SAA and SAB of the sensor unit SNS) synchronized with the clocks ø1 and ø2. The signal OS is amplified by an amplifier in the driving circuit SDR and then output as a signal AOS to the microcomputer PRS. The microcomputer PRS inputs the signal AOS from its analog input terminal, A/D-converts the signal by an internal A/D-converting function in synchronism with the clock CK, and then sequentially stores it at a predetermined address of the RAM.

Similarly, an output signal AGC of the unit SNS is an output from an AGC control sensor in the unit SNS. The signal AGC is input to the driving circuit SDR and is used to control charging of image signals in the sensors SAA and SAB of the unit SNS. A series of operations of the circuit SDR will be described in detail later.

An exposure control photometering sensor SPC receives light through the photographing lens. An output SSPC from the photometering sensor SPC is input to the analog input terminal of the microcomputer PRS, A/D-converted therein, and then used for automatic exposure control (AE).

A switch sense and indicate circuit DDR is selected when the signal CDDR is at "H" and controlled by the microcomputer PRS through the signals SO, SI, and SCLK. That is, on the basis of data supplied from the microcomputer PRS, the circuit DDR switches display of display member DSP of the camera or informs the microcomputer PRS of ON/OFF states of switches SWS interlocked with various operating members such as a release button (not shown) (interlocked with switches SW1 and SW2), a mode setting button, and the like.

Driving circuits MDR1 and MDR2 drive film feeding and shutter charging motors MTR1 and MTR2, respectively. The driving circuits MDR1 and MDR2 execute forward/reverse rotations of the motors in accordance with signals M1F, M1R, M2F, and M2R. A shutter front curtain running start magnet MG1 and a shutter rear curtain running start magnet MG2 are energized by amplifying transistors TR1 and TR2 in accordance with signals SMG1 and SMG2, respectively. Shutter control is performed by the microcomputer PRS.

Note that since the switch sense and indicate circuit DDR, the motor driving circuits MDR1 and MDR2, and shutter control are not essentially associated with the present invention, a detailed description thereof will be omitted.

A signal DCL input to a driving circuit in the lens LPRS in synchronism with the signal LCK is instruction data from the camera to a lens FLNS. An operation of the lens corresponding to an instruction is predetermined.

The driving circuit LPRS analyzes the instruction in accordance with a predetermined procedure and performs a focus adjusting or diaphragm control operation or outputs various parameters (a full-aperture f-number, a focal length, a coefficient of a defocus amount to a driving amount, and the like) of the lens from an output DLC.

In this embodiment, an integral extension type single lens is used. When a focus adjusting instruction is supplied from the camera, a focus adjusting motor LMTR is driven by signals LMF and LMR in accordance with driving amount/direction data supplied simultaneously with the instruction, thereby moving the optical system in the optical axis direction to adjust a focus. A moving amount of the optical system is monitored by a pulse signal SENC from an encoder circuit ENC constituted by, e.g., a pulse plate which is pivoted in association with movement of the optical system and outputs pulses corresponding to a moving amount and counted by a counter in the driving circuit LPRS. When predetermined movement is finished, the signals LMF and LMR are set at "L" to stop the motor LMTR.

When a diaphragm control instruction is supplied from the camera, a known stepping motor DMTR for diaphragm driving is driven in accordance with f-number data supplied simultaneously with the instruction.

Operations of the camera having the above arrangement will be described below with reference to FIGS. 4a to 4f.

When a power source switch (not shown) is operated, the microcomputer PRS is powered and starts execution of the sequence program stored in the ROM.

FIG. 4a is a flow chart for explaining an overall flow of the program. When the program is started in the above manner, a switching state of the switch SW1 which is turned on by a first stroke of the release button is detected in step (002). If the switch SW1 is turned off, the microcomputer PRS sets the signal CLCM at "H" and sends the signal as the signal SO to the lens, i.e., sends a "stop moving instruction" to the lens, thereby instructing a stop thereto, in step (003). In step (004), all control flags and variables set in the RAM of the microcomputer PRS are cleared. Steps (002), (003), and (004) are repeatedly executed until the switch SW1 or the power source switch is turned off. Therefore, even if the lens is being driven, lens driving is stopped when the switch SW1 is turned off. Note that the switching state of the switch SW1 is detected such that the signal CDDR is set at "H" and designated to the circuit DDR, a detection instruction of the switch SW1 is transmitted as the signal SO to the circuit DDR, and then the circuit DDR detects the switching state and transmits a state signal of the switch SW1 as the signal SI to the microcomputer PRS. When the switch SW1 is turned on, the flow advances to step (005). Step (005) represents a subroutine of "AE control". In this "AE control" subroutine, a series of camera operations such as photometering, exposure control, and shutter charging and film winding after exposure are controlled. Note that since the "AE control" subroutine is not essentially associated with the present invention, a detailed description thereof will be omitted. Functions of this subroutine will be briefly described below.

When the switch SW1 is turned on, the "AE control" subroutine is executed, and photometering, an exposure control calculation, and display are performed each time the subroutined is executed. When the switch SW2 is turned on by a second stroke of the release button (not shown), a release operation is started by an interruption processing function of the microcomputer PRS. That is, in accordance with an exposure amount obtained by the above exposure control calculation, a diaphragm or a shutter speed is controlled, and after exposure, one-frame photographing is performed by performing shutter charging and film feeding operations.

Note that the camera according to the embodiment of the present invention has so-called "one-shot" and "servo" modes as AF modes. When the one-shot mode is selected as the AF mode, once an in-focus state is obtained, the focus adjusting operation is not performed again until the switch SW1 is turned off. In addition, the release operation cannot be performed until the in-focus state is obtained.

In the servo mode, the focusing operation is successively performed after the in-focus state is obtained, and the release operation can be performed regardless of a result of focus detecting. Therefore, the above interruption processing is allowed when the in-focus state is obtained in the one-shot mode and is always allowed in the servo mode. However, the interruption processing is temporarily inhibited after the release operation and is allowed again after the "AF control" subroutine is executed in step (006). The one-shot and servo modes are selected by a mode selection switch (not shown).

As described above, the release operation is performed when the switch SW2 is turned on. However, when the switch SW2 is kept on after photographing of one frame of a film is finished, the release operation is returned since "AE control" is determined to be finished. Therefore, an operation performed when the switch SW2 is kept on is as follows. That is, in the one-shot mode, the release operation cannot be performed until the in-focus state is obtained, i.e., the release operation is performed when the in-focus state is obtained, and then photographing of one frame is performed. Thereafter, focus adjusting is not performed since the one-shot mode is selected, and photographing of the next frame is performed at the same lens position. Thus, photographing is successively performed while the switch SW2 is kept on.

In the servo mode, since the release operation is always allowed, photographing is performed immediately after the switch SW2 is turned on. Then, photographing is performed when the release operation is allowed after focus adjusting is performed once in the "AF control" subroutine. That is, when the switch SW2 is kept on, the "release operation" and "AF control" are alternately and repeatedly performed. In this specification, such a state is called "AF continuous photographing". In order to recognize "AF continuous photographing" in the "AF control" subroutine to be described later, "1" is set in a flag RLS after the release operation in the "AE control" subroutine.

When the "AE control" subroutine is finished in step (005) as described above, the "AF control" subroutine in step (006) is executed.

Figures 1, 4B:
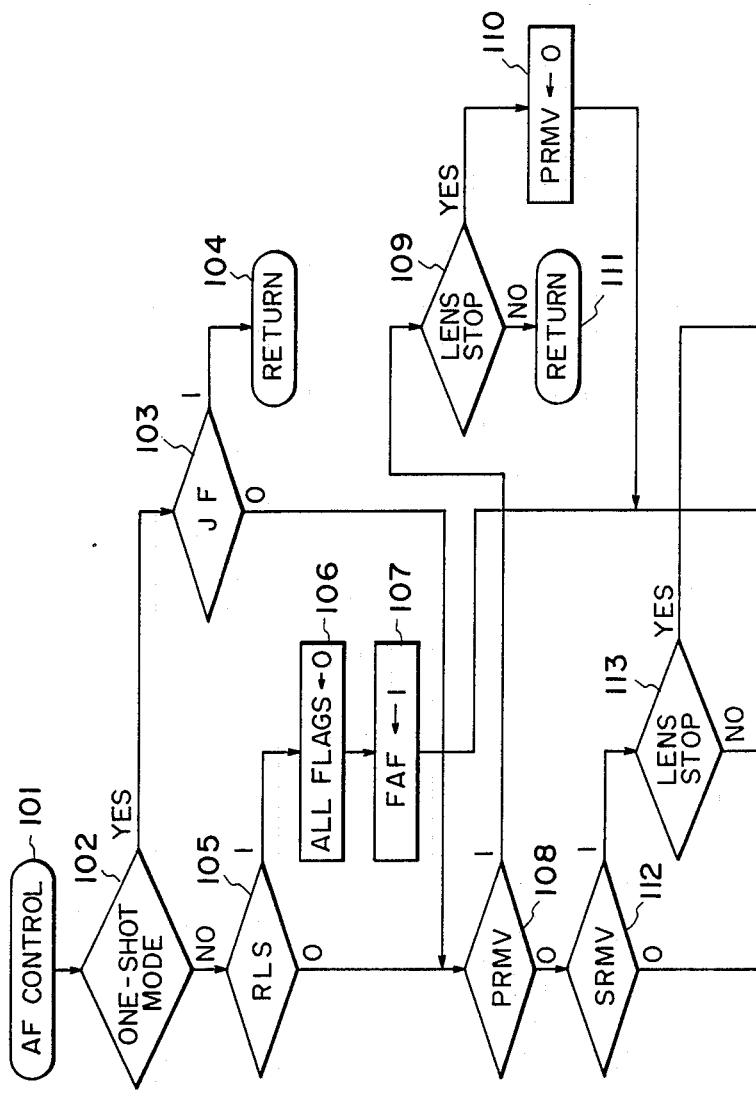
Figures 2, 4B:
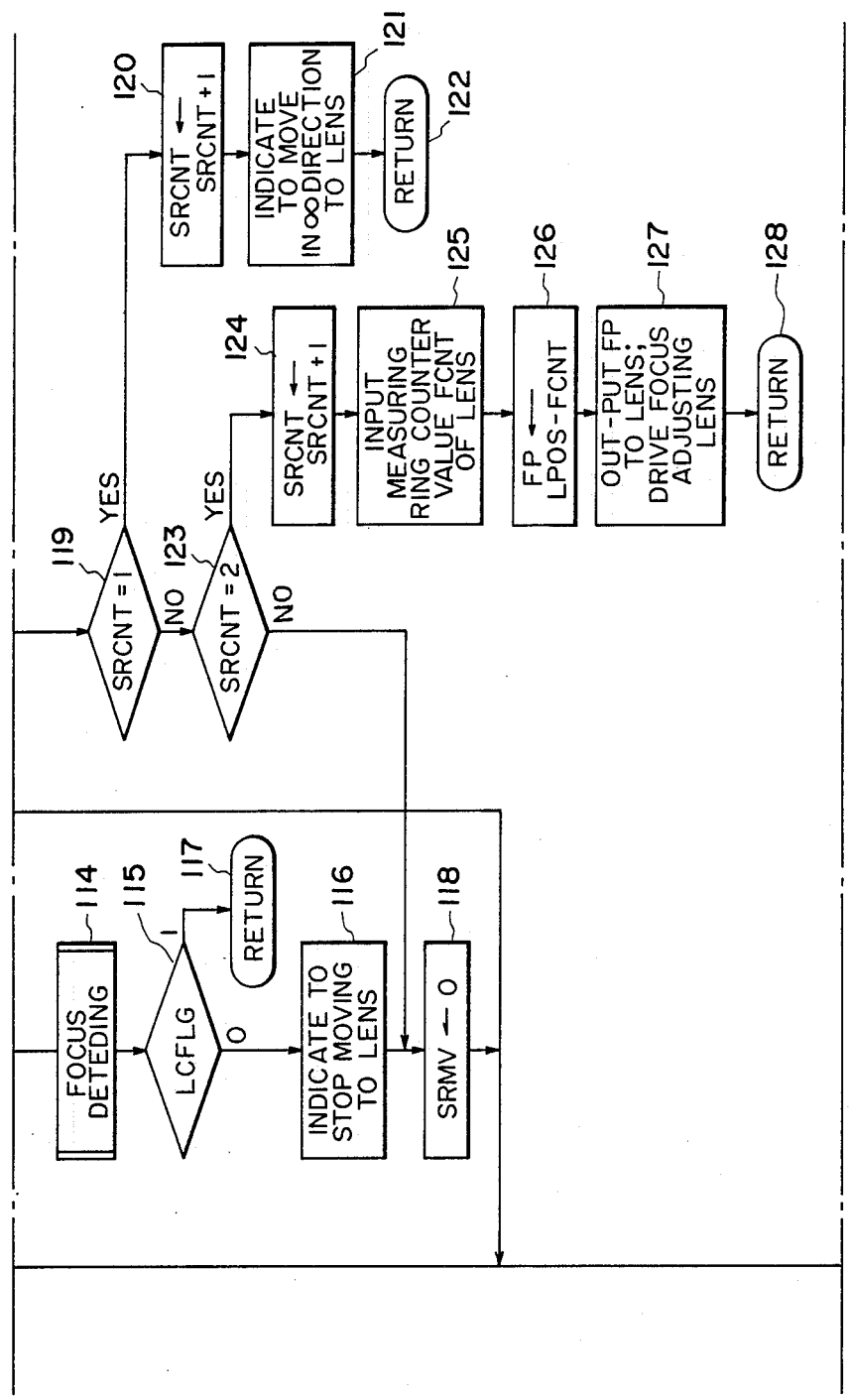

FIG. 4b, consisting of FIGS. 4b-1, 4b-2 and 4b-3, is a flow chart of the "AF control" subroutine. First, in step (102), an AF mode state is detected. Similar to detection of the switch SW1, this detection is performed by causing the microcomputer PRS to communicate with the switch sense and indicate circuit DDR and detect a switching state of the AF mode setting switch (not shown).

If the AF mode is the one-shot mode, the flow advances to step (103), and a state of a flag JF is detected. The flag JF indicates an in-focus state set in a "judgement" subroutine of step (130). Detection of the flag JF in step (103) means that a previous focusing state is checked. If "1" is set in the flag JF, the flow advances to step (104) since the in-focus state is previously obtained, and the "AF control" subroutine is returned. That is, in the one-shot mode, once the in-focus state is obtained, AF control is not performed again until the switch SW1 is turned off and all the flags are cleared in step (004). Since the flag JF is cleared in "AF control" performed for the first time after the switch SW1 is turned on, the flow advances to step (108).

If the servo mode is selected in step (102), the flow advances to step (105).

In step (105), a state of the flag RLS is detected. As described above, the flag RLS is set in the "AE control" subroutine after the release operation. If "1" is set in the flag RLS in step (105), it is recognized that this state is immediately set after the release operation in the servo mode, i.e., "AF continuous photographing", and the flow advances to step (106).

If "AF continuous photographing" is set, all the flags are cleared in step (106), "1" is set in a flag FAF in step (107), and then the flow advances to step (129). Since the release operation is always allowed in the servo mode, the flow may advance to the release operation routine by the interruption processing in any program step. Therefore, all the flags are cleared in step (106) so as to eliminate an influence of processing executed immediately before the release interruption is performed. The flag FAF is a flag for recognizing "AF continuous photographing" in the "AF control" subroutine.

If "0" is set in the flag RLS in step (105), the flow advances to step (108).

In step (108), a state of a flag PRMV is determined. As will be described later, the flag PRMV is a flag concerning lens control, and "1" is set in this flag when the lens is driven in previous "AF control". Since this is the flow executed for the first time after the switch SW1 is turned on, "0" is set in the flag PRMV, and the flow advances to step (112).

In step (112), a state of a flag SRMV is detected. The flag SRMV is a flag concerning lens control. In this case, since SRMV=0, the flow advances to step (129).

Figure 4C:
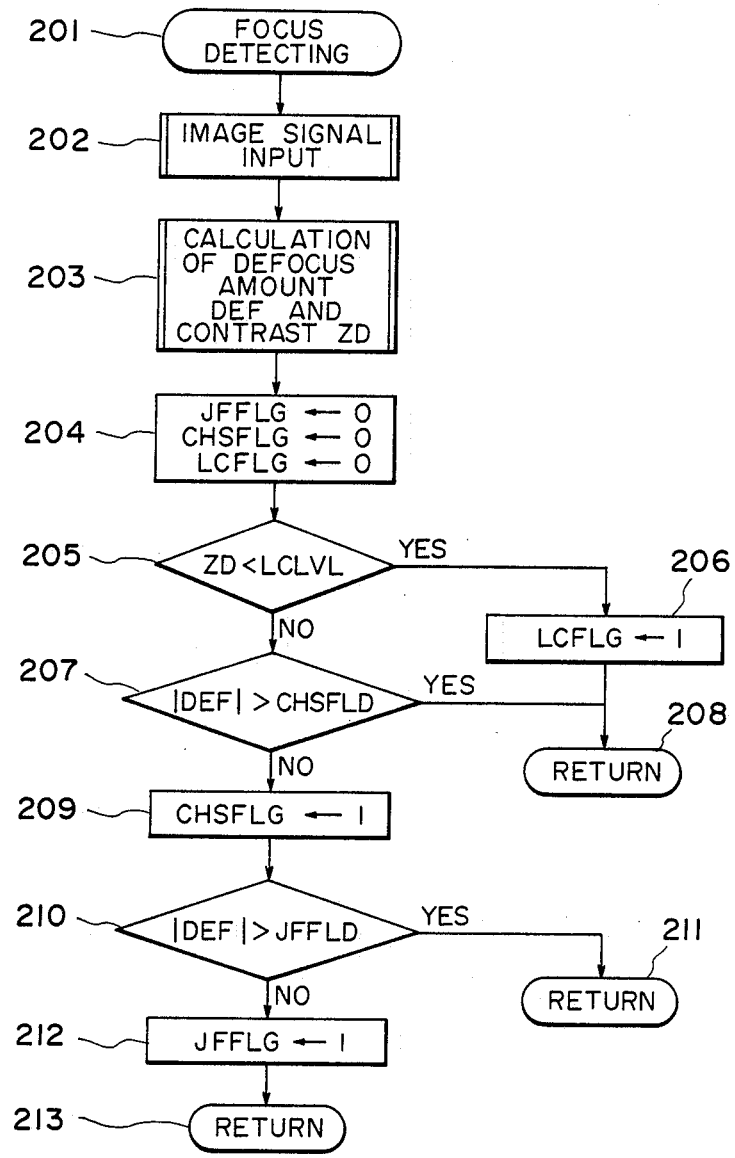

In step (129), a "focus detecting" subroutine is executed. FIG. 4c is a flow chart of this subroutine in which a focusing state of the photographing lens is detected.

In step (130), the "judgement" subroutine is executed. FIG. 4e is a flow chart of this subroutine. In the "judgement" subroutine, an in-focus state, a focus detecting disable state, and the like are judged on the basis of a result of the "focus detecting" subroutine. In addition, if lens driving is not necessary, "1" is set in a lens driving inhibit flag LMVDI.

In step (131), a "display" subroutine for displaying an in-focus or focus detecting disable state is executed. Similar to communication with the switch SW1, predetermined data is communicated to the switch sense and indicate circuit DDR so that the display unit DSP displays the appropriate information. However, since this operation is not essentially associated with the present invention, a detailed description thereof will be omitted.

In step (132), a state of the flag LMVDI is detected. As described above, "1" is set in the flag LMVDI when lens driving is not necessary. Therefore, if LMVDI=1 in step (132), the flow advances to step (133), and the "AF control" subroutine is returned to. If LMVDI=0, the flow advances to step (134), and a state of a flag LCFLG is detected.

The flag LCFLG is a low contrast flag set in the "focus detecting" subroutine of step (129), and "1" is set in this flag when contrast of an image signal is lower than a predetermined value. If "0" is set in the flag LCFLG in step (134), this means that the contrast is not sufficient for focus detecting. Therefore, "lens driving" to be described later is executed in step (135), "1" is set in the lens driving flag PRMV in step (136), and then the "AF control" subroutine is returned in step (137).

If "1" is set in the flag LCFLG in step (134), the flow advances to step (138) since the contrast is low.

A flow of steps after step (138) is a first control flow of a so-called "searching operation". In step (138), communication between the microcomputer PRS and the lens is performed, and a moving amount of the focus adjusting lens and a count value FCNT of a "measuring ring counter" for counting output pulses from the encoder ENC which is interlocked with the focus adjusting lens are input from the control circuit LPRS. This counter is reset to "0" when power supply of the lens power source VL is started, counts up the pulses when the lens is moved in a driving direction, and counts down the pulses when the lens is moved in a direction opposite to the driving direction.

Therefore, in accordance with the count value FCNT of the measuring ring counter, a relative position of the focus adjusting lens in the lens along the optical axis can be detected.

In step (139), the count value FCNT is stored in a conversion area LPOS of the RAM in the microcomputer PRS. This count value represents the relative position of the lens obtained when the searching operation is started. As will be described later, the count value is used to return the lens to this search start lens position when an object to be photographed with sufficient contrast cannot be detected by the searching operation.

Subsequently, in step (140), a "nearest direction driving instruction" is sent to the lens. This instruction is transmitted to the circuit LPRS through the circuit LCM, and the searching operation is started. The lens receives this instruction and moves the focus adjusting lens in the nearest direction. Note that when the driving instruction in the nearest direction is sent, the circuit LPRS sets the signal LMF at "H" to rotate the motor LMTR in a forward direction, thereby moving the lens in the nearest direction. When a driving instruction in an infinite direction is sent, the circuit LPRS sets the signal LMR at "H" to rotate the motor in a reverse direction, thereby moving the lens in the infinite direction. This instruction does not instruct a driving amount but only a driving direction. Therefore, when the focus adjusting lens reaches a mechanical limit of the nearest end, the control circuit LPRS detects this and the lens stops moving. Note that when an encoder pulse SENC is not generated for over a predetermined time although the lens driving instruction is sent, it is recognized that the focus adjusting lens reaches the limit position, and lens driving is stopped. In step (141), "1"s are set in a variable SRCNT and a flag SRMV. The variable SRCNT represents a state of the searching operation. "0" is set in the variable SRCNT when the searching operation is not performed, "1" is set therein when the lens is moved in the nearest direction, "2" is set therein when the lens is moved in the infinite direction, and "3" is set therein when the lens is moved toward the search start lens position. In this case, since the lens is moved in the nearest direction, "1" is set in the variable SRCNT. The flag SRMT represents that lens driving is performed by the searching operation.

First control of the searching operation is performed in steps (138) to (141), and the "AF control" subroutine is returned to in step (142).

As described above, in the "AF control" subroutine performed for the first time after the switch SW1 is turned on, an operation is performed in accordance with the focusing state judged in steps (129) and (130) regardless whether the one-shot or servo mode is selected. That is, when the in-focus state is obtained, AF control is immediately returned to without driving the lens. When a defocus amount is detected in an out-of-focus state, the lens is moved in an in-focus direction corresponding to the defocus amount in step (135), and then AF control is returned. When the contrast is judged to be low, the lens is driven in the nearest direction to perform the searching operation, and then AF control is returned to.

When the "AF control" subroutine is finished in step (006) of FIG. 4a, the switching state of the switch SW1 is detected again in step (002). If the switch SW1 is kept off, a moving stop instruction is sent to the lens in step (003). That is, even if the lens driving instruction is sent in the previous "AF control" subroutine, lens driving is stopped when the switch SW1 is turned off. Then, in step (004), all the flags are cleared.

When the switch SW1 is kept on in step (002), the "AE control" subroutine of step (005) is executed, and then the "AF control" subroutine is started in step (006).

A flow of the "AF control" subroutine for the second time and thereafter executed when the switch SW1 is kept on will be described below with reference to respective cases.

First, a case will be described in which the contrast is not low (i.e., "0" is set in the flag LCFLG) and lens driving is performed ("1" is set in the flag PRMV) in the previous "AF control" subroutine, i.e., the lens is moved in the in-focus direction in the out-of-focus state.

When the "AF control" subroutine is executed, a mode judgement is performed in step (102). In this case, "0" is set in the flag JF because the out-of-focus state is previously judged, the switch SW2 is not turned on, and the release operation is not executed. Therefore, regardless whether the one-shot or servo mode is selected, the flow advances to step (108). In step (108), a state of the flag PRMV is judged, and then the flow advances to step (109). In step (109), the microcomputer PRS sets the signal CLCM at "H", transmits the signal to the circuit LPRS through the circuit LCM to communicate with the lens, and inputs information of a lens driving state from the control circuit LPRS. That is, the control circuit LPRS counts the pulses from the encoder ENC by the counter, and when the count value coincides with the pulse count corresponding to the defocus amount obtained in the "focus detecting" subroutine, sets the signals LMF and LMR at "L" to stop the motor LMTR, thereby stopping lens driving. When control of a lens driving amount corresponding to the defocus amount is finished, the control circuit LPRS forms a lens stop signal therein. In step (109), the control circuit LPRS outputs the lens stop signal to the microcomputer PRS, thereby judging whether lens driving corresponding to the defocus amount is finished. If predetermined lens driving is finished and the lens is already stopped, the flow advances to step (110), and the flag PRMV is cleared. Thereafter, a new focus adjusting operation from step (129) is started. If the lens is not stopped yet, the flow advances to step (111), and the "AF control" subroutine is returned to. That is, until driving by an amount indicated to the lens in step (135) of previous "AF control" is finished, a new focus adjusting operation is not executed, i.e., the new focus adjusting operation from step (129) is executed only when lens driving is finished. When it is judged that the lens is moved to the in-focus position in previous lens driving and the in-focus state is obtained in steps (129) and (130) of the new focus adjusting operation from step (129), "1"s are set in the flags JF and LMVDI, the "AF control" subroutine is returned to, and the lens is held at the in-focus position. When the flow advances to step (006) again after the "AF control" subroutine is returned to and the "AF control" subroutine is executed, the flag JF of "1" is detected in step (103) in the one-shot mode. Therefore, no focus detecting/judgement operations are performed even if the "AF control" subroutine is repeated thereafter, and the lens is held at the in-focus position. In the servo mode, steps (105), (108), and (112), and steps from (129) are repeated each time "AF control" is executed. Therefore, the lens is moved to the in-focus position in accordance with movement of the object to be photographed. As described above, in processing wherein the switch SW1 is kept on and steps (005) and (006) are repeated to repeat the "AF control" subroutine, unless the low contrast is judged in the focus detecting/judgement subroutine executed each time the "AF control" subroutine is executed, (1) lens driving based on the defocus amount obtained when the out-of-focus state is detected→(2) defocus amount detection after lens driving and focusing state detection judgement such as in-focus detection and low contrast detection are repeated. In the one-shot mode, after in-focus judgement is performed in a repetitive operation of (1) and (2), the repetitive operation of (1) and (2) is stopped, and the lens is held at a position at which the in-focus state is judged. In the servo mode, operations of (1) and (2) are repeatedly performed. When the object to be photographed is moved after the in-focus state is judged and an out-of-focus state is judged, the lens is moved by the operation of (1) until the in-focus state is judged by judgement of (2). Thereafter, this operation is repeatedly executed so that the lens is moved to the in-focus position in accordance with movement of the object to be photographed.

A case wherein the low contrast is judged ("1" is set in the flag LCFLG) in the previous "AF control" subroutine and the searching operation is performed ("1" is set in the flag SRMV) will be described below.

When the "AF control" subroutine is executed after the searching operation is performed, a state of the flag SRMV is detected in step (112), and the flow advances to step (113).

In step (113), information of a lens driving state is input from the lens. If the lens is already stopped, the flow advances to step (119). Otherwise, the flow advances to step (114).

As described above with reference to step (109), the control circuit LPRS in the lens forms the lens stop signal when lens driving corresponding to the defocus amount is performed. However, when the lens is moved in the nearest or infinite direction by the searching operation, the defocus amount information is not supplied to the lens. When the lens reaches the nearest or infinite end, the encoder ENC no longer generates pulses although the lens driving instruction is sent, so that the control circuit LPRS forms the lens stop signal in this state. Therefore, in step (113), the lens stop signal is detected as in step (109), thereby branching the flow into steps (119) and (114).

As described above, the searching operation performs control of:

(1) moving the lens in the nearest direction (variable SRCNT=1);

(2) moving the lens in the infinite direction (variable SRCNT=2) when an object to be photographed having sufficient contrast cannot be detected during driving of (1) and the focus adjusting lens reaches the mechanical limit in the nearest direction; and (3) moving the lens to the search start lens position (variable SRCNT=3) when an object to be photographed having sufficient contrast cannot be detected during driving of (2) and the focus adjusting lens reaches the mechanical limit in the infinite direction.

During lens driving, the "focus detecting" subroutine is executed in step (114). In this subroutine, a defocus amount and contrast of an object to be photographed are detected. In step (115), a state of the low contrast flag LCFLG is judged. If "1" is set in the low contrast flag LCFLG, i.e., the contrast is low, the "AF control" subroutine is returned to in step (117). That is, in the searching operation, focus detecting is performed during lens driving. In this case, if the contrast is low, the lens is still driven. If "0" is set in the flag LCFLG in focus detecting during lens driving, and it is judged that the contrast is not low, the flow advances to step (116). In step (116), the "moving stop instruction" is sent to the lens to set the signals LMR and LMF at "L", thereby stopping moving of the lens. Thereafter, the flag SRMV is cleared in step (118), and then in step (129), new focus adjusting control is performed. That is, when not the low contrast but the sufficient contrast for focus detecting is detected in focus detecting during the searching operation, the lens is stopped to finish the searching operation ("0" is set in the flag SRMV), and new focus detecting from step (129) is performed to move the lens to the in-focus position. When the contrast is not detected while the lens is moved in the nearest direction in the operation of (1), the "AF control" subroutine is returned to in step (117) each time the "AF control" subroutine is executed until the focus adjusting lens of the lens reaches the mechanical limit in the nearest direction.

When sufficient contrast is not detected in the above operation, and the lens is kept moving in the nearest direction. When the lens reaches the nearest end, a lens stop is detected in step (113), and the flow advances to step (119). In this case, since this is the operation of (1), the flow advances to step (120). Note that in the case of the operation of (2), the flow advances from step (119) to step (123) and then to step (124). In the case of the operation of (3), the flow advances to step (118), and the searching operation is finished. The cases of (2) and (3) will be described later. In step (120), "1" is added to the variable SRCNT. This operation is performed to move the lens in the infinite direction because the lens has reached the nearest end. In step (121), an "infinite direction driving instruction" is sent to the lens. Similar to nearest direction moving, this moving instruction is transmitted to the lens, and the lens is moved in the infinite direction, thereby starting the searching operation (2). Then, in step (122), the "AF control" subroutine is returned to. During the operation of (2), steps (113) and (115) are repeatedly executed until the lens reaches the infinite end. If sufficient contrast cannot be obtained, the "AF control" subroutine is returned to in step (117) each time the "AF control" subroutine is executed as in operation of (1). If the sufficient contrast is detected during movement toward the infinite end, steps (116) and (118) are executed as in the operation of (1). Thereafter, by the operation from step (129), the lens is moved to the in-focus position.

When the low contrast state is held by the operation of (2) and the focus adjusting lens of the lens reaches the mechanical limit in the infinite direction, a lens stop is detected in step (113), and the flow advances to step (123) through step (119). In this case, since the searching operation is the operation (2), "2" is set in the variable SRCNT, and the flow advances from step (123) to step (124). In step (124), "1" is added to the variable SRCNT to obtain SRCNT=3, thereby starting the searching operation of the operation-(3).

In step (125), the measuring ring counter value FCNT described above is input, and in step (126), a value of LPOS - FCNT is stored in the variable FP. A value of the measuring ring counter which represents a lens position obtained when the searching operation is performed in steps (138) and (139) is stored in the variable LPOS. The variable FCNT is a current counter value which represents a lens position obtained when the operation of (2) is finished. Therefore, the variable FP obtained by subtracting the current counter value from the variable LPOS represents a measuring ring counter value from the current lens position to the search start position. In step (127), this variable FP is sent to the driving circuit LPRS as in communication described above, thereby instructing lens driving by an amount corresponding to the measuring ring counter value FP. The circuit LPRS detects a moving amount of the lens on the basis of the variable FP in accordance with the pulses from the encoder ENC as in lens driving control based on a normal defocus amount and drives the lens by an amount corresponding to the variable FP to move it to the search start position. Then, in step (128), the "AF control" subroutine is returned to. In the searching operation (3), control performed during lens driving on the basis of the variable FP is similar to those of the operations (1) and (2). That is, when sufficient contrast is detected while the lens approaches the search start position, the lens is stopped. Thereafter, a normal focus adjusting operation is started in steps from step (129). When sufficient contrast is not judged during the operation of (3) and the focus adjusting lens reaches the search start position, a lens stop is detected in step (113), and the flow advances to step (118) through steps (119) and (123). In step (118), the flag SRMV is cleared to finish the searching operation, and a new focus adjusting operation is started from step (129).

"AF continuous photographing" in which the servo mode is selected as the AF mode and the switch SW2 is kept on will be described below. In this case, as described above, "1" is set in the release flag RLS in the "AF control" subroutine. Therefore, in the "AF control" subroutine executed after exposure is performed in the release operation, a state of the flag RLS is detected in step (105), and then the flow advances to step (106). In step (106), all the flags are cleared to initialize all states concerning previous "AF control", and the flow advances to step (107). In step (107), "1" is set in the AF continuous photographing flag FAF, and then the flow advances to step (129) to execute the focus adjusting operation. During AF continuous photographing, a state of the flag PRVM or SRMV concerning lens driving or the searching operation is not judged. The reason for this and lens driving in AF continuous photographing will be described in detail later with reference to "lens driving" subroutine.

The flow of the "AF control" subroutine described above can be summarized as follows. That is, when the "AF control" subroutine is executed from the main routine of the camera, focus detecting is performed. If low contrast is not detected, the lens is moved on the basis of a defocus amount, and a focus adjusting operation is not performed until lens driving of a predetermined amount is completed. If the low contrast is detected, the searching operation is started. In this case, the lens is first moved in the nearest direction, and focus detecting is performed during lens driving. If an object to be photographed having sufficient contrast is detected, lens driving is immediately stopped, and the focus adjusting operation is performed again in this lens stop state. When no contrast is detected and the lens reaches the nearest end, the lens is moved in the infinite direction. If the lens reaches the infinite end, then it is moved to the search start position. If sufficient contrast is detected during this lens driving, the lens is stopped, and a focus adjusting operation is performed. When no contrast is detected and the lens reaches the search start position, the searching operation is finished.

FIG. 4c is a flow chart of the "focus detecting" subroutine.

In step (202), an "image input signal" subroutine is executed, and an image signal from the sensor unit SNS is stored in a predetermined area in the microcomputer PRS. A flow chart of the "image signal input" subroutine shown in FIG. 4d will be described later.

Then, in step (203), the defocus amount DEF and the contrast amount ZD of the photographing lens are calculated in accordance with the image signal already stored. A method of this calculation is disclosed in Japanese Patent Application No. 61-160824 filed by the present applicant, and hence a detailed description thereof will be omitted.

In step (204), three flags JFFLG, CHSFLG, and LCFLG are cleared. In step (205), the contrast amount ZD is compared with a predetermined amount LCLVL. If ZD<LCLVL, the flow advances to step (206), and "1" is set in flag LCFLG. That is, if the contrast amount ZD is smaller than the predetermined amount LCLVL, "1" is set in the low contrast flag LCFLG. Then, in step (208), the "focus detecting" subroutine is returned to. If ZD≧LCLVL in step (205), the flow advances to step (207), and an absolute value of the defocus amount DEF is compared with a predetermined value CHSFLD. If |DEF|≦CHSFLD, the flow advances to step (208), and the "focus detecting" subroutine is returned to.

If |DEF|≦CHSFLD in step (207), "1" is set in the flag CHSFLG in step (209). That is, if the contrast is sufficient and the defocus amount falls within an in-focus near range represented by CHSFLD, "1" is set in the flag CHSFLG representing a range near the in-focus range.

Subsequently, in step (210), the absolute value |DEF| is compared with a predetermined amount JFFLD (JFFLD<CHSFLD). If |DEF|>JFSFLD, the flow advances to step (211), and the "focus detecting" subroutine is returned to. If |DEF|≦JFSFLD, "1" is set in the flag JFFLG, and then the "focus detecting" subroutine is returned to in step (213). That is, if the defocus amount falls within an in-focus range represented by JFFLD, "1" is set in the in-focus range flag JFFLG. As described above, in the "focus detecting" subroutine, the defocus amount and the contrast amount of the photographing lens are detected. If the low contrast is detected, "1" is set in the low contrast flag LCFLG, and if the contrast is sufficient, the flag LCFLG is cleared to "0". If the defocus amount falls within the range represented by the flag CHSFLG, "1" is set in the flag CHSFLG, and if the defocus amount falls within the in-focus range, "1" is set in the flag JFFLG. Then, the subroutine is returned to.

Figure 4D:
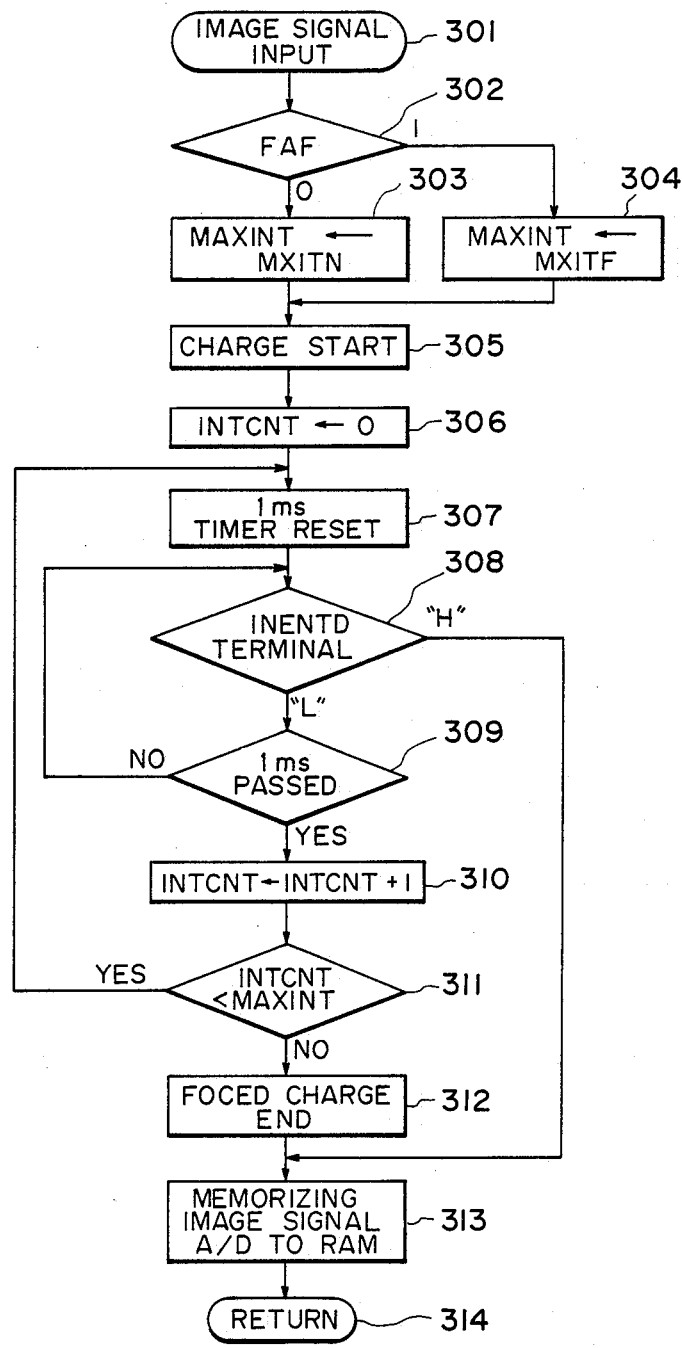
Figure 4E:
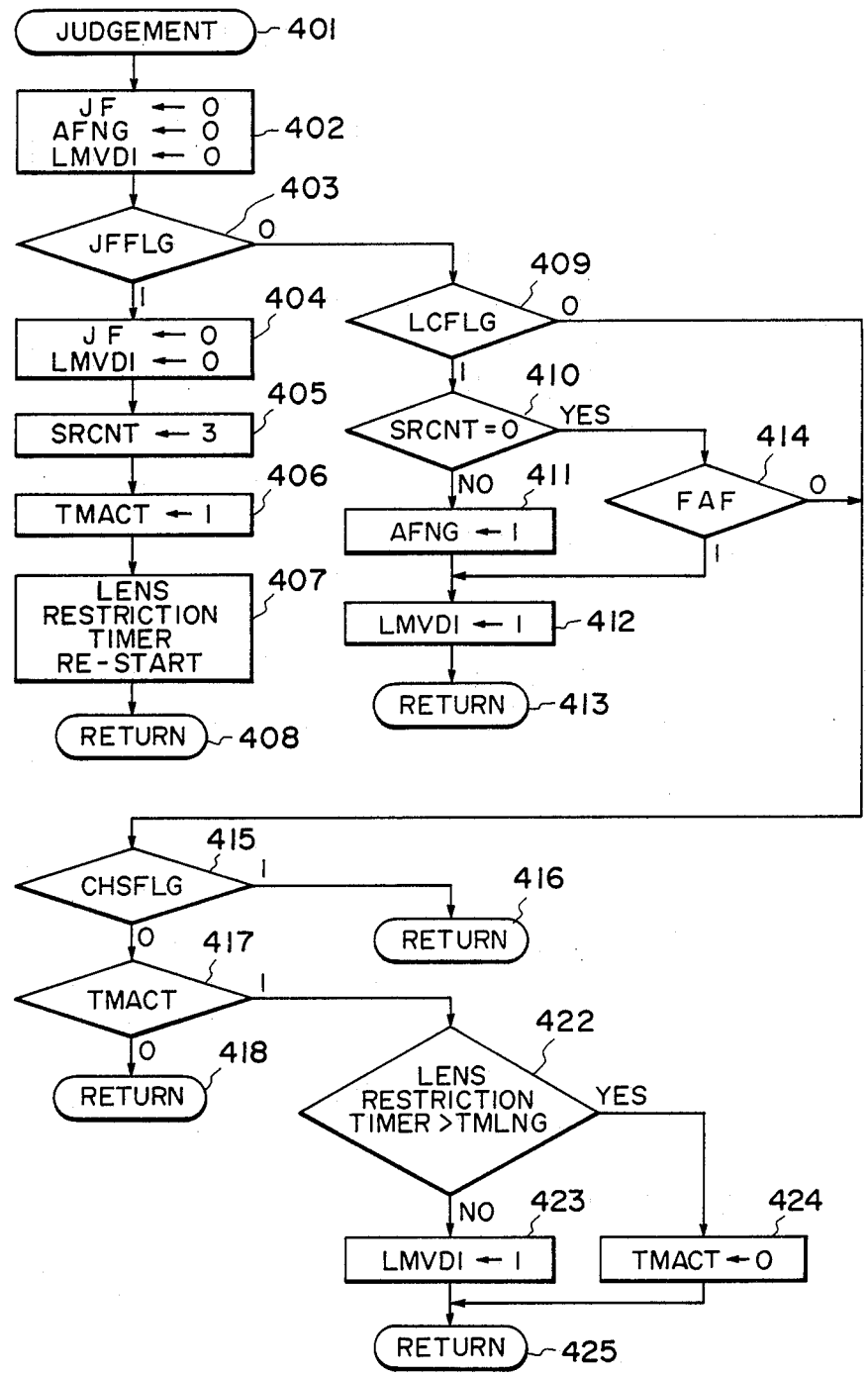

FIG. 4d is a flow chart of the "image signal input" subroutine. When the "image signal input" subroutine is executed, a state of the AF continuous photographing flag FAF is judged in step (302). If "1" is set in the flag FAF, a predetermined value MXITF is stored in a variable MAXINT in step (304). If "0" is set in the flag FAF, the predetermined value MXINT is stored in the variable MAXINT. The variable MAXINT is a variable for defining a maximum charge time of the sensor in msec, and MXITN>MXITF. Therefore, a short maximum charge time is set in an AF continuous photographing time.

In step (305), the sensor unit SNS starts charging of the light image. More specifically, the microcomputer PRS sends a "charge start instruction" to the driving circuit SDR, and the circuit SDR sets a clear signal CLR of the photoelectric conversion element section of the unit SNS at "L", thereby starting charging of electricity.

In step (306), a charge time counter INTCNT set in the RAM is initialized to "0". In step (307), a 1-ms counter timer is reset to start a counting operation from this reset state. Note that this 1-ms counter timer utilizes the timer function of the microcomputer PRS.

In step (308), a state of an input terminal INTEND of the microcomputer PRS is detected to check whether charging is ended. The driving circuit SDR sets the signal INTEND at "L" and monitors the signal AGC from the sensor unit SNS when charging is started. When the signal AGC reaches a predetermined level, the circuit SDR sets the signal INTEND at "H", and at the same time, sets an electric charge transfer signal SH at "H" for a predetermined time interval, thereby transferring the electric charge at the photoelectric conversion element section to the CCD section.

If the INTEND terminal is at "H" in step (308), the flow advances to step (313) assuming that charging is ended. If the INTEND terminal is at "L" in step (308), the flow advances to step (309) assuming that charging is not ended. If charging is not ended, it is checked in step (309) whether the 1-ms timer which is reset in step (307) has counted 1 ms. If 1 ms has not passed, the flow returns to step (308) and waits for an end of charging or an elapse of 1 ms. If 1 ms has passed, before charging is ended, the flow advances to step (310). In step (310), the charge time counter INTCNT is incremented by one, and the flow advances to step (311). In step (311), the counter INTCNT is compared with the variable MAXINT. The variable MAXINT is the maximum charge time represented in ms as described above. If the counter is below the variable MAXINT, the flow returns to step (307) to wait for an end of charging again. If the counter INTCNT coincides with the variable MAXINT, the flow advances to step (312) to forcedly end charging. This forced charge end is executed by sending a "charge end instruction" from the microcomputer PRS to the driving circuit SDR. When the "charge end instruction" is supplied from the microcomputer PRS, the circuit SDR sets the electric charge transfer signal SH at "H" for a predetermined time interval and transfers the electric charge of the photoelectric conversion section to the CCD section. Charging of the sensor is ended up to step (312). That is, when charging is completed within the maximum time MAXINT from the start of charging in steps (305) to (311), the flow advances to step (313). If charging is not completed within the above time, the charge operation is forcedly ended when the above time has passed, and the flow advances to step (313).

In step (313), the signal AOS obtained by amplifying the image signal OS from the sensor unit SNS by the driving circuit SDR is A/D-converted, and the resultant digital signal is stored in the RAM. More specifically, the circuit SDR generates the CCD driving clocks ∅1 and ∅2 in synchronism with the clock CK from the microcomputer PRS and supplies them to a control circuit SSCNT in the unit SNS. The CCD section of the unit SNS is driven in accordance with the clocks ∅1 and ∅2, and the electric charge in the CCD section is time-serially output as the image signal, i.e., the output OS. This signal is amplified by the amplifier in the circuit SDR and then input as the signal AOS to the analog input terminal of the microcomputer PRS. The microcomputer PRS A/D-coverts the signal AOS in synchronism with the clock CK which is output by itself, and sequentially stores the resultant digital image signal at a predetermined address of the RAM. When image signal input is ended in this manner, the "image signal input" subroutine is returned to in step (314). FIG. 4e is a flow chart of a "judgement subroutine.

In step (402), three flags JF, AFNG, and LMVDI are cleared. The flag JF represents an in-focus state, the flag AFNG represents a focus detecting disable state, and the flag LMVDI inhibits lens driving.

In step (403), a state of the in-focus range flag JFFLG set in the "focus detecting" subroutine is judged. If "1" is set in the flag JFFLG, the flow advances to step (404). Step (404) is a step for controlling the in-focus state, and "1" s are set in the in-focus flag JF and the lens driving inhibit flag LMVDI in this step. Then, in step (405), "3" is set in the variable SRCNT. As described above, the variable SRCNT represents a state of the searching operation, and SRCNT=3 means that the searching operation is ended. That is, when the in-focus state is obtained, a state becomes the same as that obtained when the searching operation is ended. Subsequently, in step (406), "1" is set in the flag TMACT. The flag TMACT represents that a lens restriction timer is in an operation and will be described in more detail later. The lens restriction timer is started in step (407), and the "judgement" subroutine is returned to in step (408). The lens restriction timer utilizes an internal timer of the microcomputer PRS and can start counting from a re-start timing and arbitrarily read the contents.

If "0" is set in the in-focus range flag JFFLG in step (403), the flow advances to step (409), and the state of the low contrast flag LCFLG set in the "focus detecting" subroutine is judged. If "1" is set in the flag LCFLG in step (409), the flow advances to step (410) assuming that a result of focus detecting indicates low contrast.

In step (410), a state of a searching operation state variable SRCNT is detected. If the variable SRCNT is other than "0", the flow advances to step (411). In this case, the fact that the variable SRCNT is not "0" means that the searching operation is executed after the switch SW1 is turned on or such a state is forcedly set since the in-focus state is obtained. Therefore, in order not to perform the searching operation, "1" is set in the focus detecting disable flag AFNG in step (411), and "1" is set in the lens driving inhibit flag LMVDI in step (412). If "1" is set in the flag LMVDI in step (412), the flow advances from step (132) to step (133) in the "AF control" subroutine of FIG. 4(b) to restore "AF control", so that the searching operation from step (138) is not executed.

If "0" is set in the variable SRCNT in step (410), the flow advances to step (414), and a state of the AF continuous photographing flag FAF is detected.

If "1" is set in the flag FAF in step (414), i.e., AF continuous photographing is selected, the flow advances to step (412). In step (412), "1" is set in the flag LMVDI so as not to execute the searching operation. If "0" is set in the flag FAF in step (414), the flow advances to step (415), and the operation of the "AF control" subroutine is executed.

That is, the above searching operation is executed when the low contrast is judged in the focus detecting subroutine in step (129) in the "AF control" subroutine and "1" is set in the flag LCFLG. However, if "1" of the flag LMVDI is detected in the immediately preceding step (132), the flow does not advance to the searching operation from step (138). Therefore, even if the low contrast is judged in step (129), no searching operation is executed.

When SRCNT≠0 is judged in step (410) although the low contrast is judged in the focus detecting subroutine of step (129) in the "judgement" subroutine, or when AF continuous photographing is judged in step (414) although SRCNT =0, "1" is set in the flag LMVDI in step (412). In this case, even if the low contrast is judged in step (129), no searching operation is executed.

In addition, SRCNT≠0 when the searching operation is previously performed. Therefore, if the searching operation is previously performed and the low contrast is judged when the "AF control" subroutine is executed thereafter, the flow advances to step (132) and then to step (133). The flow returns to the "AF control" subroutine. As a result, the above searching operation is performed only once.

SRCNT=3 is obtained even if the in-focus state is judged in the "judgement" subroutine. Therefore, if the low contrast is judged in step (129) during the "AF control" subroutine, no searching operation is performed. Even if low contrast is judged in step (129) in AF continuous photographing, no searching operation is performed. As a result, a shutter chance is not missed by the searching operation executed during AF continuous photographing.

Therefore, in the "AF control" subroutine repeated while the switch SW1 is kept on, the searching operation is executed once only when the in-focus state is not previously performed, AF continuous photographing is not selected, and the low contrast is judged for the first time. Thereafter, the searching operation is inhibited as long as the switch SW1 is kept on.

If "0" is set in the low contrast flag LCFLG in step (409) of the "judgement" subroutine, i.e., the contrast is sufficient, the flow advances to step (415).

In step (415), if "1" is set in the in-focus near flag CHFLG, the flow advances to step (416) to return the "judgement" subroutine. If "0" is set in the flag CHSFLG in step (415), the flow advances to step (417) assuming that the defocus amount does not fall within the range near the in-focus range.

In step (417), a state of the lens restriction timer operation flag TMACT is judged. If "0" is set in the flag TMACT, i.e., the timer is not operated, the flow advances to step (418) and the flow returns to the "judgement" subroutine. If "1" is set in the flag TMACT, i.e., the timer is operated, the flow advances to step (422) to control the lens restriction timer.

A constant TMLNG defines an operation time of the lens restriction timer. When the lens restriction timer which starts counting since the in-focus state is obtained is below the constant TMLNG, lens driving is inhibited.

When the timer exceeds the constant TMLNG, lens driving is allowed.

In step (422), a value of the lens restriction timer which performs counting is compared with the predetermined constant TMLNG. If the former is larger than the latter, the flow advances to step (424), and the lens restriction timer operation flag TMACT is cleared. Then, in step (425), the "judgement" subroutine is returned to. If the latter is larger than the former in step (422), the flow advances to step (423), and "1" is set in the lens driving inhibit flag. Then, in step (425), the "judgement" subroutine is returned to.

In steps (415) to (425), when the contrast is not low and the state near the in-focus state is obtained, the flow advances to step (135) through steps (131), (132), and (134) after the "judgement" subroutine is executed, and the lens is moved in the in-focus direction. If the state near the in-focus state is obtained, lens driving of step (135) is inhibited by steps (132) and (133) until a predetermined time interval has passed after the in-focus state is obtained once. After the predetermined time interval has passed, lens driving is executed on the basis of the defocus amount in step (135).

The flow of the "judgement" subroutine described above with an overall operation can be summarized as follows.

In the repetitive operation of the "AE control" and "AF control" subroutines executed when the switch SW1 is turned on, if the focus detecting result indicates that the defocus amount falls outside the in-focus range, the lens is moved on the basis of the defocus amount. After lens driving based on the defocus amount is ended, the focus detecting and judgement operations are performed again. In this state, if the in-focus state is not judged, lens driving based on the detected defocus amount and focus detecting/judgement are executed until the in-focus state is judged. When the in-focus state is judged, "1" is set in the in-focus flag JF, and "1" is also set in the lens driving inhibit flag LMVDI. As a result, the searching operation is not performed even if the low contrast is detected as long as the switch SW1 is kept on, and at the same time, the lens restriction timer is operated. If the one-shot mode is selected in this state, focus detecting/judgement and lens driving are not executed at all in the following "AF control" subroutine, and the lens is held at the position at which the in-focus state is obtained.

In the servo mode, the focus detecting and judgement operations and the lens driving operation are executed each time the "AF control" subroutine is performed even after the in-focus state is obtained. Therefore, the lens is always moved to the in-focus position in accordance with movement of an object to be photographed.

If the low contrast is judged in the "AF control" subroutine, the searching operation is executed. However, although the low contrast is judged, if the in-focus state is judged in the "AF control" subroutine performed after the switch SW1 is turned on, "1" is set in the flag LMVDI so as not to perform the searching operation even if the low contrast is judged. Similarly, in order to inhibit the searching operation during AF continuous photographing, "1" is set in the flag LMVDI.

Therefore, the searching operation is executed once only under the conditions that AF continuous photographing is not selected, the in-focus state is not previously judged while the "AF control" subroutine is repeated, and the low contrast is judged.

When the focus detecting/judgement operation and lens driving are repeatedly executed, the lens is immediately moved. However, when the detected defocus amount exceeds the predetermined value, lens driving is not executed if the lens restriction timer is still operated after the in-focus state is obtained, i.e., a predetermined time interval has not passed thereafter. That is, after the predetermined has passed, lens driving is performed.

In the searching operation, lens driving is immediately performed.

As for the image signal charge time in the focus detecting operation, when AF continuous photographing is selected, the maximum charge time is set shorter than that in normal AF, so that the AF operation time is minimized and the shutter release operation interval is reduced.

Figure 4F:
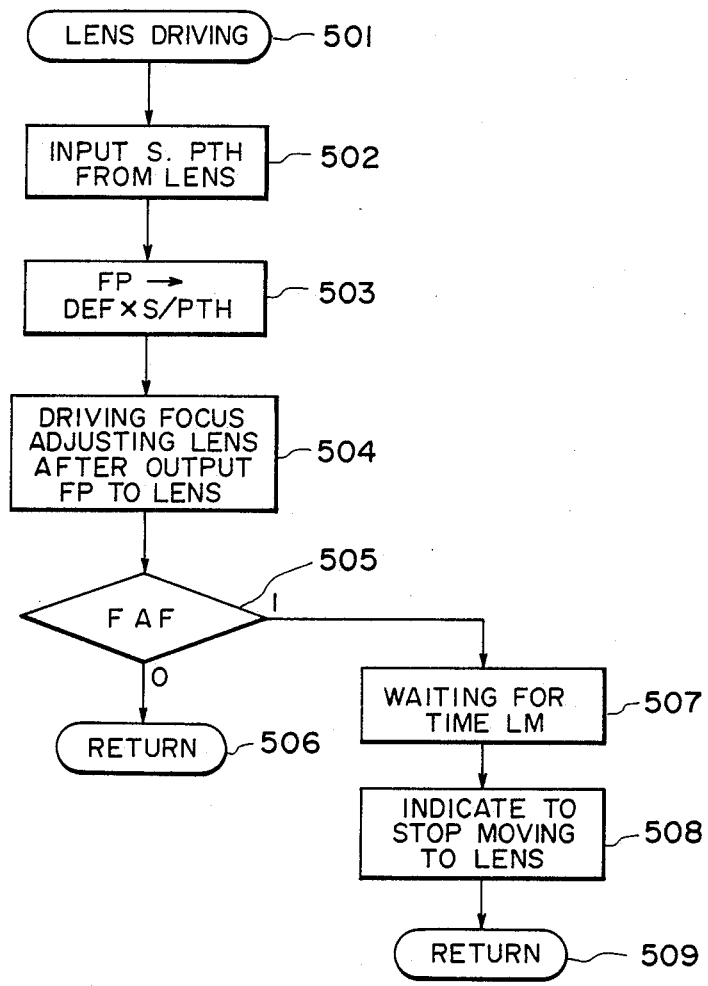

FIG. 4f is a flow chart of the "lens driving" subroutine.

When this subroutine is executed, the microcomputer PRS communicates with the lens in step (502), and two data "S" and "PTH" are input therefrom. Data "S" represents a "coefficient of a defocus amount to a focus adjusting lens driving amount". For example, when an integral extension type single lens is used, S=1 since the entire photographing lens is the focus adjusting lens. When a zoom lens is used, the coefficient S varies in accordance with a zooming position. Data "PTH" presents a focus detecting lens driving amount per pulse which is output from the encoder ENC interlocked with movement of the focus adjusting lens LNS in the optical axis direction. Note that these data are stored in a memory of the circuit LPRS and input to the microcomputer PRS when the microcomputer communicates with the control circuit LPRS in the lens.

Therefore, a value of the focus adjusting lens driving amount represented by the number of output pulses from the encoder, i.e., a so-called lens driving amount FP can be obtained as follows in accordance with the current defocus amount DEF of the photographing lens and the data S and PTH:

$$FP = DEF \times S/PTH$$

In step (503), the above equation is directly executed.

In step (504), the lens driving amount FP obtained in step (503) is sent to the lens to drive the focus adjusting lens (when an integral extension type single lens is used, the entire photographing lens is driven).

Then, in step (505), a state of the AF continuous photographing flag is detected. If "0" is set in the flag FAF, the flow advances to step (506) assuming that normal focus adjusting is selected, and the "lens driving" subroutine is returned to.

If "1" is set in the flag FAF in step (505), i.e., AF continuous photographing is selected, lens control of AF continuous photographing is executed in steps (507) and (508).

In step (507), a predetermined time LM is waited for. This predetermined time LM corresponds to a driving time (predetermined) of lens driving instructed in step (504). After the time LM has passed, the lens is instructed to stop moving in step (508), and then in step (509), the "lens driving" subroutine is returned to. In AF continuous photographing, "AE control" and "AF control" are alternately performed as described above. At this time, in the "AE control" subroutine, a series of release operations (film exposure and film winding) are executed by interruption processing of the switch SW2.

Therefore, since the release operations are executed immediately after the "AF control" subroutine is finished, no extra time remains for lens driving. For this reason, a time for AF continuous photographing is prepared. That is, in AF continuous photographing, lens driving is performed only for the time LM. Thereafter, when the "AF control" subroutine is returned to, the release operations are immediately performed. Therefore, in AF continuous photographing, the lens driving time is always LM.

In addition, in continuous photographing, the searching operation is not performed, and lens driving is completed in the "AF control" subroutine. Therefore, states of the flags PRMV and SRMU concerning lens driving need not be judged in the main routine described above.

The above time LM is shorter than a time required for driving the lens by an amount corresponding to the defocus amount when the defocus amount is large. Therefore, in this case, although the in-focus state cannot always be obtained, a photographing interval can be reduced so that continuous photographing can be advantageously performed.

Note that in the above embodiment of the present invention, a signal microcomputer performs a photographing operation and a focus adjusting operation. However, two microcomputers may be used to perform these operations independently of each other.

In addition, in the above embodiment, the searching operation is inhibited when the in-focus state is obtained. The searching operation may be inhibited when the in-focus near state is obtained.

As has been described above, according to the present invention, the searching operation is inhibited after the in-focus state is obtained or is inhibited during continuous photographing, or when the searching operation is ended, the lens is moved to a position at which the lens is located immediately before the searching operation is started. Therefore, optimal searching operation control can be performed with respect to a camera incorporating an automatic focusing apparatus.

What is claimed is:

1. A camera incorporating an automatic focusing apparatus, comprising:
    (a) a focus detecting circuit for outputting a focusing signal representing a focusing state of a focusing optical system;
    (b) a driving circuit for driving said focusing optical system to an in-focus position in accordance with a focusing signal from said focus detecting circuit;
    (c) judging means for judging whether focus detecting is impossible;
    (d) a search control circuit for, when said judging means judges that focus detecting is impossible, transmitting a searching signal instead of the focusing signal to said driving circuit in accordance with a judgement signal output from said judging means, said driving circuit driving said focusing optical system within a predetermined range in accordance with the searching signal, and said search control circuit transmitting the focusing signal to said driving circuit when said judging means judges that focus detecting becomes possible during a drive control operation of said focusing optical system performed in accordance with the searching signal, thereby restoring a focusing optical system driving state based on the focusing signal; and
    (e) inhibiting means for inhibiting driving of said focusing optical system controlled by said search control circuit after said focus detecting circuit outputs the focusing signal representing an in-focus state.

2. A camera according to claim 1, wherein said focus detecting circuit comprises a light-receiving sensor unit for receiving image light of an object to be photographed incident through said focusing optical system and outputs the focusing signal on the basis of an sensor output and a contrast signal representing contrast of the object to be photographed with respect to the sensor unit, and said judging means judges that focus detecting is impossible when a value of the contrast signal is lower than a predetermined value and said judging means outputs the judgement signal.

3. A camera according to claim 1, wherein said search control circuit has a first mode for driving said focusing optical system to one end in a movable direction of said focusing optical system in response to the searching signal and a second mode for driving said focusing optical system from the one end to the other end in the movable direction in response to the searching signal.

4. A camera according to claim 2, wherein said search control circuit has a first mode for driving said focusing optical system to one end in a movable direction of said focusing optical system in response to the searching signal and a second mode for driving said focusing optical system from the one end to the other end in the movable direction in response to the searching signal.

5. A camera incorporating an automatic focusing apparatus having an automatic focusing mode in which a focusing state of a focusing optical system is repeatedly detected and said focusing optical system is moved toward an in-focus position on the basis of a detection result and a searching mode in which, when focus detecting becomes impossible during the automatic focusing mode, said focusing optical system is driven within a movable range of said focusing optical system regardless of the focusing state, comprising:
    (a) focus detecting means for generating an output when an in-focus or a near-in-focus state is obtained by driving said focusing optical system in the automatic focusing mode; and
    (b) an inhibiting circuit for allowing transition from the automatic focusing mode to the searching mode until said focus detecting means generates the output and for inhibiting the transition from the automatic focusing mode to the searching mode after said focus detecting means generates the output.

6. A camera according to claim 1, further comprising a driving control circuit for deenergizing said driving circuit when said judging means judges that focus detecting is impossible after the focusing signal from said focus detecting circuit represents the in-focus state.

7. A camera incorporating an automatic focusing apparatus having (1) an automatic focusing mode in which a focusing state of a focusing optical system is repeatedly detected and said focusing optical system is moved toward an in-focus position on the basis of a detection result, and (2) a searching mode in which, when focus detecting becomes impossible during the automatic focusing mode, said focusing optical system is driven within a movable range of said focusing optical system regardless of the focusing state, the driving of the optical system in the searching mode beginning from the position of the optical system at which focus detection becomes impossible, comprising:

(a) a mode switching circuit for changing the searching mode to the automatic focusing mode when a focus detecting disable state is changed to a focus detecting able state during driving of said focusing optical system in the searching mode; and (b) a control circuit for controlling a driving state of said focusing optical system in the searching mode, said control circuit driving, when the searching mode continues, said focusing optical system within a movable range of said focusing optical system and then moving said focusing optical system to a position at which said searching mode was started, thereby causing, when the focus detection is impossible, the driving of said focusing optical system in the search mode to finish at the position where the search mode was started irrespective of the starting position of said optical system in the search mode.

8. A camera incorporating an automatic focusing apparatus having (1) an automatic focusing mode in which a focusing state of a focusing optical system is repeatedly detected and said focusing optical system is moved toward an in-focus position on the basis of a detection result, and (2) a searching mode in which, when focus detecting becomes impossible during the automatic focusing mode, said focusing optical system is driven within a movable range of said focusing optical system regardless of the focusing state, the driving of the optical system in the searching mode beginning from the position of the optical system at which focus detection becomes impossible, comprising:

(a) a mode switching circuit for changing the searching mode to the automatic focusing mode when a focus detecting disable state is changed to a focus detecting able state during driving of said focusing optical system in the searching mode; and (b) a control circuit for controlling a driving state of said focusing optical system in the searching mode, said control circuit driving, when the searching mode continues, said focusing optical system within a movable range of said focusing optical system and then moving said focusing optical system to a position at which the searching mode was started, thereby ending driving in the searching mode, wherein said control circuit moves, when the searching mode is started, said focusing optical system from a current position to one end of a movable range of said focusing optical system, moves said focusing optical system from said one end to the other end of the movable range, and then moves said focusing optical system to said current position at which said focusing optical system is located when the searching mode is started.

9. A camera incorporating an automatic focusing apparatus having (1) an automatic focusing mode in which a focusing state of a focusing optical system is repeatedly detected and said focusing optical system is moved toward an in-focus position on the basis of a detection result, and (2) a searching mode in which, when focus detecting becomes impossible during the automatic focusing mode, said focusing optical system is driven within a movable range of said focusing optical system regardless of the focusing state, comprising:

(a) a mode switching circuit for changing the searching mode to the automatic focusing mode when a focus detecting disable state is changed to a focus detecting able state during driving of said focusing optical system in the searching mode; and (b) a control circuit for controlling a driving state of said focusing optical system in the searching mode, said control circuit driving, when the searching mode continues, said focusing optical system within a movable range of said focusing optical system and then moving said focusing optical system to a position at which the searching mode is started, thereby ending driving in the searching mode wherein said control circuit comprises (1) position signal forming means for forming a position signal which represents a position of said focusing optical system, and (2) memory means for storing the position signal formed by said position signal forming means when the searching mode is started, and wherein said control circuit controls driving of said focusing optical system on the basis of a value stored in said memory means when said focusing optical system is to be moved, in the searching mode, to the position at which said focusing optical system is located when the searching mode is started.

10. An automatic focusing apparatus having (1) an automatic focusing mode in which a focusing optical system is moved toward an in-focus position on the basis of a focusing state detected by a focus detecting circuit, and (2) a searching mode in which, when focus detection becomes impossible, said focusing optical system is driven within a predetermined range regardless of the focusing state detected by said focus detecting circuit, comprising:

(a) an in-focus detection means for detecting that the focusing optical system becomes in-focus or near-in-focus by driving said focusing optical system in the automatic focusing mode; and (b) an inhibiting circuit for allowing transition from the automatic focusing mode to the searching mode until said in-focus detection means detects the in-focus or near-in-focus state, and for inhibiting the transition from the automatic focusing mode after said in-focus detecting means detects the in-focus or near-in-focus state.

11. An automatic focusing apparatus having (1) an automatic focusing mode in which a focusing optical system is moved toward and in-focus position on the basis of a focusing state detected by a focus detecting circuit, and (2) a searching mode in which, when focus detection becomes impossible, said focusing optical system is driven within a predetermined range regardless of the focusing state detected by said focus detecting circuit, comprising:

(a) a mode switching circuit for changing the automatic focusing mode to the searching mode when a focus detection able state is changed to a focus detection disable state during driving of said focusing optical system in the automatic focusing mode; and (b) a control circuit for terminating the driving of said focusing optical system in the searching mode by moving said focusing optical system to a position where the driving of said focusing optical system in the searching mode was started when the search mode continues, thereby causing, while the searching mode continues, the driving of the optical system to be terminated at a position where the focus detection became disabled irrespective of the optical system starting position in the search mode.

* * * * *

UNITED STATES PATENT AND TRADEMARK OFFICE
CERTIFICATE OF CORRECTION

PATENT NO. : 4,967,225

DATED : October 30, 1990

INVENTOR(S) : Akira Akashi

It is certified that error appears in the above-identified patent and that said Letters Patent is hereby corrected as shown below:

FIG. 4B-2 (Sheet 5):

Box 114, "DETEDING" should read --DETECTING--.

FIG. 4d (Sheet 8)

Box 308, "INENTD" should read --INTEND--, and

Box 312, "FOCED" should read --FORCED--.

COLUMN 5:

Line 45, "subroutined" should read --subroutine--.

COLUMN 11:

Line 33, "and" should be deleted.

Line 56, "the" should be deleted.

UNITED STATES PATENT AND TRADEMARK OFFICE
CERTIFICATE OF CORRECTION

PATENT NO. : 4,967,225

DATED : October 30, 1990

INVENTOR(S) : Akira Akashi

It is certified that error appears in the above-identified patent and that said Letters Patent is hereby corrected as shown below:

COLUMN 13:

Line 37, "$|DEF| \leq CHSFLD$," should read --$|DEF| > CHSFLD$,--.

Line 66, "subroutine.  When"

should read

--subroutine.
       When--.

COLUMN 15:

Line 18, ""judgement subroutine." should read
   --"judgement" subroutine--.

COLUMN 16:

Line 36, "cortrol"" should read --control"--.

Line 53, "return" should read --return to--.

COLUMN 18:

Line 8, "predetermined" should read
   --predetermined time interval--.

UNITED STATES PATENT AND TRADEMARK OFFICE
CERTIFICATE OF CORRECTION

PATENT NO. : 4,967,225

DATED : October 30, 1990

INVENTOR(S) : Akira Akashi

It is certified that error appears in the above-identified patent and that said Letters Patent is hereby corrected as shown below:

COLUMN 20:

Line 10, "an" should read --a--.

COLUMN 21:

Line 45, "was" should read --is--.

COLUMN 22:

Line 45, "and" should read --an--.

Signed and Sealed this

Second Day of June, 1992

Attest:

DOUGLAS B. COMER

*Attesting Officer*     Acting Commissioner of Patents and Trademarks